(12) United States Patent
Adamic (10) Patent No.: US 9,523,006 B2
(45) Date of Patent: Dec. 20, 2016

(54) ERASURE FLUID

(75) Inventor: Raymond Adamic, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1 day.

(21) Appl. No.: 14/114,947

(22) PCT Filed: Jun. 3, 2011

(86) PCT No.: PCT/US2011/039014
§ 371 (c)(1),
(2), (4) Date: Oct. 31, 2013

(87) PCT Pub. No.: WO2012/166147
PCT Pub. Date: Dec. 6, 2012

(65) Prior Publication Data
US 2014/0066348 A1 Mar. 6, 2014

(51) Int. Cl.
*C11D 1/00* (2006.01)
*C11D 3/33* (2006.01)
(Continued)

(52) U.S. Cl.
CPC ............... *C09D 9/04* (2013.01); *C11D 3/2003* (2013.01); *C11D 3/222* (2013.01); *C11D 3/225* (2013.01);
(Continued)

(58) Field of Classification Search
CPC .......... C11D 1/72; C11D 3/06; C11D 3/2065; C11D 3/2079; C11D 3/2082; C11D 3/2048; C11D 3/3951; C11D 3/3953; C11D 3/3956; C11D 3/22; C11D 3/3958; C11D 3/3902; C11D 3/3942; B41J 2/21; B41J 2/17; B41J 11/0015; B41J 29/26; B41J 29/36; B41J 29/367; B41J 29/373
(Continued)

(56) References Cited

U.S. PATENT DOCUMENTS 2,960,558 A 11/1960 Marsal et al.
3,850,831 A * 11/1974 Hellsten ............... C11D 3/2065
510/108
(Continued)

FOREIGN PATENT DOCUMENTS

EP 0118004 9/1984
EP 0446564 9/1991
(Continued)

OTHER PUBLICATIONS

Heinze, Jurgen, "Ultramicroelectrodes in Electrochemistry", Angew. Chem. Int. Ed. Engl., 1993, 32, pp. 1268-1288.

*Primary Examiner* — Gregory R Delcotto
(74) *Attorney, Agent, or Firm* — Dierker & Kavanaugh, P.C.

(57) ABSTRACT

An erasure fluid includes a vehicle, an erasure component incorporated into the vehicle, and a polymer. The erasure component interacts with a selected colorant of an erasable inkjet ink printed on a medium to erase the inkjet ink from the medium, and is chosen from persulfate ions, peroxymonosulfate ions, hydrogen peroxide, chlorate ions, hypochlorite ions, ascorbic acid, and a chelating agent. Further, the polymer is chosen from carboxymethylcelluloses, methyl celluloses, polyethylene glycols, guar gum, starches, and combinations thereof.

20 Claims, 5 Drawing Sheets

(51) Int. Cl.
*C11D 3/26* (2006.01)
*C11D 3/39* (2006.01)
*C09D 9/04* (2006.01)
*C11D 3/22* (2006.01)
*C11D 3/37* (2006.01)
*C11D 3/395* (2006.01)
*C11D 7/26* (2006.01)
*B41J 29/26* (2006.01)
*C11D 1/72* (2006.01)
*B41J 29/36* (2006.01)
*C11D 3/20* (2006.01)
*B41J 29/367* (2006.01)

(52) U.S. Cl.
CPC .......... *C11D 3/3707* (2013.01); *C11D 3/3947* (2013.01); *C11D 3/3956* (2013.01); *C11D 7/261* (2013.01); *B41J 29/26* (2013.01); *B41J 29/36* (2013.01); *B41J 29/367* (2013.01); *C11D 1/72* (2013.01); *C11D 3/2044* (2013.01); *C11D 3/2065* (2013.01); *C11D 3/2079* (2013.01)

(58) Field of Classification Search
USPC ............... 510/174, 201, 202, 206, 372, 380, 421,510/477, 488, 505, 506; 347/101
See application file for complete search history.

(56) References Cited

U.S. PATENT DOCUMENTS

| | | | |
|---|---|---|---|
| 4,261,799 A | 4/1981 | Anizan et al. | |
| 4,413,266 A | 11/1983 | Aviram et al. | |
| 4,874,537 A * | 10/1989 | Peterson et al. | 510/304 |
| 4,954,174 A | 9/1990 | Imagawa | |
| 4,960,464 A | 10/1990 | Chen | |
| 5,281,358 A | 1/1994 | Urushibata et al. | |
| 5,507,926 A | 4/1996 | Keller et al. | |
| 5,643,409 A | 7/1997 | Hamaguchi et al. | |
| 5,691,292 A * | 11/1997 | Marshall | C11D 3/3765 510/221 |
| 5,711,791 A | 1/1998 | Croker et al. | |
| 5,852,073 A | 12/1998 | Villiger et al. | |
| 6,013,122 A | 1/2000 | Klitzman et al. | |
| 6,030,519 A | 2/2000 | Keller et al. | |
| 6,096,349 A * | 8/2000 | Petri | C11D 3/222 424/613 |
| 6,110,883 A * | 8/2000 | Petri et al. | 510/372 |
| 6,163,673 A | 12/2000 | Shindo | |
| 6,436,342 B1 * | 8/2002 | Petri et al. | 422/28 |
| 6,444,021 B1 | 9/2002 | Weisbecker et al. | |
| 6,544,601 B1 | 4/2003 | Kong | |
| 6,783,657 B2 | 8/2004 | Marsh et al. | |
| 6,905,539 B2 | 6/2005 | Patel et al. | |
| 7,192,335 B2 | 3/2007 | Lee et al. | |
| 7,192,911 B2 * | 3/2007 | Sunder et al. | 510/223 |
| 7,767,057 B2 | 8/2010 | Rosencrance et al. | |
| 9,315,042 B2 | 4/2016 | Adamic | |
| 2003/0119687 A1 | 6/2003 | Chikosi | |
| 2004/0107505 A1 * | 6/2004 | Harrison | C11D 3/222 8/115.51 |
| 2004/0138084 A1 * | 7/2004 | Gohl | C11D 1/835 510/417 |
| 2004/0167048 A1 * | 8/2004 | Sunder | C11D 1/66 510/220 |
| 2004/0225032 A1 | 11/2004 | Spencer et al. | |
| 2005/0003984 A1 * | 1/2005 | Himmrich et al. | 510/312 |
| 2005/0019421 A1 * | 1/2005 | Hobbs et al. | 424/616 |
| 2005/0119151 A1 * | 6/2005 | Mayer | C11D 3/37 510/476 |
| 2005/0143274 A1 * | 6/2005 | Ghosh | A61K 8/22 510/303 |
| 2005/0272622 A1 * | 12/2005 | Hariharan | C11D 3/124 510/267 |
| 2006/0034984 A1 | 2/2006 | Baydo et al. | |
| 2006/0089281 A1 | 4/2006 | Gibson | |
| 2006/0147717 A1 | 7/2006 | Hasegawa et al. | |
| 2006/0281655 A1 * | 12/2006 | Stehr | C11D 3/3942 510/375 |
| 2007/0022800 A1 | 2/2007 | Zifferer et al. | |
| 2007/0049510 A1 | 3/2007 | Fujii et al. | |
| 2007/0054827 A1 * | 3/2007 | Cheung | 510/238 |
| 2007/0151945 A1 | 7/2007 | Miyamachi et al. | |
| 2007/0159517 A1 | 7/2007 | Hashimoto et al. | |
| 2007/0228005 A1 | 10/2007 | Hasegawa et al. | |
| 2008/0193725 A1 | 8/2008 | De Saint-Romain | |
| 2009/0143273 A1 * | 6/2009 | Cheung | 510/391 |
| 2009/0165228 A1 * | 7/2009 | Kilkenny | A01N 37/36 15/104.94 |
| 2009/0258156 A1 | 10/2009 | Chretien et al. | |
| 2009/0270304 A1 * | 10/2009 | Cermenati | C11D 3/042 510/420 |
| 2009/0325839 A1 * | 12/2009 | Wortley et al. | 510/192 |
| 2010/0022427 A1 * | 1/2010 | Warkotsch et al. | 510/191 |
| 2010/0123759 A1 | 5/2010 | Matsui et al. | |
| 2010/0160201 A1 * | 6/2010 | Scheuing | C11D 3/48 510/180 |
| 2010/0234269 A1 * | 9/2010 | Dreilinger | C11D 1/04 510/405 |
| 2010/0273695 A1 * | 10/2010 | Sehgal et al. | 510/174 |
| 2011/0150949 A1 * | 6/2011 | Gonzales | C11D 3/3749 424/401 |
| 2011/0150950 A1 * | 6/2011 | Gonzales et al. | 424/401 |
| 2012/0238005 A1 * | 9/2012 | Wieland | C11D 3/361 435/264 |
| 2013/0022556 A1 * | 1/2013 | Gonzales et al. | 424/54 |

FOREIGN PATENT DOCUMENTS

| | | |
|---|---|---|
| EP | 0492224 | 7/1992 |
| JP | 56-040577 | 4/1981 |
| JP | 04-039100 | 2/1992 |
| JP | 2000056497 | 2/2000 |
| JP | 2000154345 | 6/2000 |
| KR | 20090041874 | 4/2009 |
| WO | WO 03/101753 | 12/2003 |
| WO | WO 2007/005063 | 1/2007 |
| WO | WO2011/032988 | * 3/2011 |

* cited by examiner

ERASURE FLUID

BACKGROUND

The present disclosure relates generally to erasure fluids.

Inkjet printing is an effective way of producing images on a print medium, such as paper. Inkjet printing generally involves ejecting ink droplets (formed, e.g., from one or more inks) from a nozzle at high speed by an inkjet printing system onto the paper to produce the images thereon. In some instances, it may be difficult to effectively erase the inkjet ink(s) in the solid state, such as when the inks are established on the paper.

BRIEF DESCRIPTION OF THE DRAWINGS

Features and advantages of examples of the present disclosure will become apparent by reference to the following detailed description and drawings.

DETAILED DESCRIPTION

Example(s) of the erasure fluid as disclosed herein may advantageously be used in a process designed to erase an inkjet image from the surface of a medium. The erasure fluid is specifically formulated to interact with a particular erasable inkjet ink used to form the image on the surface of the medium. It is believed that when the erasure fluid effectively interacts with the inkjet ink, the colorant of the inkjet ink degrades. It is further believed that the degradation of the colorant causes the image to disappear from the surface of the medium. In an example, about 80% to about 100% of the image may be erased via an erasing process utilizing examples of the erasure fluid disclosed herein.

The inventor of the present disclosure has found that when examples of the erasure fluid interact with examples of the erasable inkjet ink, images formed by the erasable inkjet ink are erased in a relatively "human-friendly" and "environment-friendly" manner. This may be due, at least in part, to the fact that the examples of the erasable inkjet ink and the examples of the erasure fluid are specifically formulated to include human-friendly and environment-friendly components. It is to be understood that as used herein, the terms "human-friendly" or the like and "environment-friendly" or the like are generally defined as components: listed as Generally Recognized As Safe (GRAS) by the United States Food and Drug Administration (FDA); complying with the FDA's Federal Food, Drug and Cosmetic Act (FFDCA); appearing in the United States Environmental Protection Agency's (EPA) CleanGredients® list; and/or appearing in similar lists; and/or categorized in a similar manner. Examples of the erasable inkjet ink may be found in PCT International Application Serial No. PCT/US11139023 filed concurrently herewith, which Is incorporated by reference herein in its entirety. Examples of the erasure fluid specifically designed to interact with the examples of the erasable inkjet ink will be described in detail below.

It is to be understood that the examples of the erasure fluid described herein are tied, at least in part, to the nature of the colorant(s) of the erasable Inkjet ink used to create the image on the medium. For example, certain colorants have been found to be more erasable than others; and thus a lower concentration of the component(s) responsible for causing the degradation of the colorant(s) in the erasure fluid (referred to herein as "erasure component(s)") may be required to effectively erase the image from the medium during the erasing process. Further, certain colorant(s) of the inkjet ink may be more responsive to one particular erasure component, while other(s) may be more responsive to another particular erasure component. Accordingly, several different examples of the erasure fluid may be formulated, where each may be specifically designed to be used to erase a particular erasable inkjet ink (i.e., an ink that includes a colorant that is responsive to the erasure component of the erasure fluid).

It is further to be understood that examples of the erasure fluid are designed to erase the image from a medium such as paper. The paper may be chosen from any cellulose-based paper, i.e., paper that includes cellulose fibers. For instance, the medium may be made from pulp fibers derived from hardwood trees (e.g., deciduous trees (angiosperms) such as birch, oak, beech, maple, and eucalyptus) and/or softwood trees (e.g., coniferous trees (gymnosperms) such as varieties of fir, spruce, and pine, (e.g., loblolly pine, slash pine, Colorado spruce, balsam fir and Douglas fir)), and these pulps may be prepared via any known pulping process. Further, the cellulose-based paper may include one or more fillers to control the physical properties of the medium. Examples of fillers include ground calcium carbonate, precipitated calcium carbonate, titanium dioxide, kaolin clay, silicates, and combinations thereof. It is to be understood that the cellulose-based paper may be referred to herein as plain paper.

Other examples of the paper medium include resin-coated papers (such as, e.g., photobase paper) and papers made from or including polyethylene (PE), polypropylene (PP), polyethylene terephthalate (PET), polylactic acid (PLA), and/or the like, and/or combinations thereof.

In another example, the medium may be chosen from COLORLOK® papers (available from Hewlett-Packard, Co., Houston, Tex.), which are plain papers having calcium chloride incorporated in the paper structure.

Examples of the erasure fluid will now be described herein. It is to be understood that each of these examples include a vehicle and at least an erasure component incorporated into the vehicle. As used herein, the term "vehicle" refers to the combination of at least one or more solvents to form a vehicle within which the erasure component is incorporated to form the erasure fluid. In some examples, the vehicle may also include an additive, which is a constituent of the fluid that may operate to enhance performance, environmental effects, aesthetic effects, or other similar properties of the erasure fluid. Examples of the additive include surfactants, pH buffers, biocides, and/or the like, and/or combinations thereof. In other examples, the vehicle does not include an additive.

As previously mentioned, the vehicle includes at least one solvent, which is/are used as a carrier for the erasure component and may, in some examples, constitute the bulk of the erasure fluid. In an example, the solvent is chosen from 1,2-propanediol, glycerol, tetraethylene glycol, sorbitol, and combinations thereof. The solvent(s) may be present in an amount ranging from about 1 wt % to about 50 wt % of the erasure fluid. In another example, the solvent(s) is/are present in an amount ranging from about 1 wt % to about 25 wt %. In still another example, the solvent(s) is/are present in an amount ranging from about 10 wt % to about 25 wt % of the erasing fluid.

In one example, the solvent is chosen from a combination of 1,2-propanediol and glycerol, where the 1,2-propanediol is present in an amount ranging from about 1 wt % to about 25 wt % of the erasure fluid, and the glycerol is present in an amount ranging from about 1 wt % to about 25 wt %. In another example, the 1,2-propanediol and the glycerol are each present in an amount ranging from about 5 wt % to about 15 wt % of the erasure fluid; and in still another example, each are present in an amount ranging from about 5 wt % to about 10 wt % of the erasure fluid. Further, tetraethylene glycol, if used as a solvent in the vehicle, may be present in the erasure fluid in an amount ranging from about 1 wt % to about 25 wt %; and in another example, ranges from about 5 wt % to about 15 wt % of the erasure fluid. In still another example, the tetraethylene glycol may be present in an amount ranging from 5 wt % to about 10 wt %.

In an example, the vehicle may also include a surfactant that may be used, in part, as a wetting agent to wet the surface of the device (e.g., a roll coater) that may be used to apply the erasure fluid to the image formed on the medium. In this respect, the surfactant is chosen from a non-hydrophobic material. Further, the surfactant may also be incorporated into the erasure fluid to facilitate the removal of the colorant of the erasable inkjet ink from the medium (e.g., from fibers of plain papers or coated papers). In this respect, the surfactant is also chosen from a group of surfactants that may contribute to the removal of the colorant from the fibers of the medium. Examples of the surfactant that may be incorporated into the vehicle include the surfactants of the SURFYNOL® family (such as SURFYNOL® 465, available from Air Products, Inc., Lehigh Valley, Pa.), the surfactants of the TERGITOL® family (available from the Dow Chemical Co., Midland, Mich.), SILWET® 7602 (available from Momentive Performance Materials, Albany, N.Y.), and combinations thereof. The surfactant(s), if used in the erasure fluid, may be present in the erasure fluid an amount ranging from about 0.1 wt % to about 5 wt % of the erasure fluid. In another example, the surfactant(s) may be present in an amount ranging from about 0.1 wt % to about 1 wt %.

In another example, a biocide such as PROXEL® GXL (available from Arch Chemicals, Inc., Norwalk, Conn.), may be added to the erasure fluid to protect the fluid from bacterial growth. The amount of the biocide present in the erasure fluid, if one is incorporated, ranges from about 0.05 wt % to about 1 wt %.

Further, a pH buffer may also be incorporated into the vehicle, some examples of which include 3-(N-morpholino) propanesulfonic acid (MOPS), 3-morpholino-2-hydroxypropanesulfonic acid (MOPSO), 1,4-piperazinediethanesulfonic acid (PIPES), tris(hydroxymethyl)aminomethane (TRIS), and/or other similar biological buffers. Other examples of buffers include inorganic buffers such as sodium acetate, sodium phosphate, and/or sodium borate.

As previously mentioned, the erasure component of the erasure fluid is specifically chosen to interact with a particular colorant of the erasable inkjet ink used to form the image on the medium. It is believed that the interaction of the erasure component with the colorant causes the inkjet ink (and thus the image) established on the medium to disappear. More specifically, when the erasure fluid is applied to the inkjet ink (i.e., the image) on the medium during the erasing process, the colorant of the ink (which may include a component that acts as a catalyst for the reaction) triggers a chemical reaction between the colorant and the erasure component. This chemical reaction causes the colorant to degrade, and when this occurs, the ink substantially completely disappears from the surface of the medium, at which time the image is considered to be erased.

As used herein, an ink "substantially completely disappears" from the medium when there is no image on the medium that is noticeable or otherwise decipherable by the human eye. For instance, an ink substantially completely disappears from the medium when about 80% to about 100% of the ink disappears. The amount of ink erased may be determined by visual perception and/or by measuring the optical density or LAB coordinates between the original and erased sample. The optical density or LAB coordinates may be measured with a densitometer. For example, 90% ink disappearing (as used herein) means that 10% of the optical density remains on the erased page.

It is to be understood that the amount (e.g., percentage) of the ink remaining after erasing depends, at least in part, on the amount of the erasure fluid applied, the chemistry of the ink, or combinations thereof. Details of the chemical interaction that occurs between the colorant and the erasure component during erasing may be found in PCT International Application Serial No. PCT/US11/39025 filed concurrently herewith, which is incorporated by reference herein in its entirety.

In one example, the erasure component may be chosen from an oxidant/reductant that effectively interacts with the colorant of the erasable ink. Certain oxidants/reductants (such as, e.g., peroxides) may effectively interact with the colorant in the presence of oxygen molecules. It is believed that a degassed colorant (i.e., where no oxygen molecules are present) may be nonreactive, or have a very slow reaction rate when the colorant comes into contact with the erasure component. In an example, the oxygen molecules may come from air present in the surrounding environment within which the erasing process is being performed, or may be supplied to the medium (e.g., from an oxygen supply) during the erasing process.

Examples of oxidants/reductants that may be used for the erasure component include persulfate ions (e.g., from sodium persulfate, potassium persulfate, lithium persulfate, etc.), peroxymonosulfate ions (e.g., from sodium peroxymonosulfate, potassium peroxymonosulfate, lithium peroxymonosulfate, etc.), hydrogen peroxide, chlorate ions (e.g., from sodium chlorate, potassium chlorate, etc.), hypochlorite ions (e.g., from sodium hypochlorite, potassium hypochlorite, etc.), sodium ascorbate, and ascorbic acid.

As previously mentioned, the concentration of the erasure component depends, at least in part, on the erasability of the colorant and on desired environmental levels. For instance, it may be desirable to maintain the concentration level of the oxidants/reductants to a value at or below 3 wt % to achieve the desired erasability of the ink and desired environmental levels, though lower concentration levels may also be used. It is to be understood, however, that the lower concentration level may affect the erasability of the ink. For instance, a concentration of the oxidants/reductants of about 1 wt % may result in a 30% to 50% drop in the erasability of the ink. It may also be possible to increase the concentration of the oxidants/reductants to an amount above 3 wt % (such as, e.g., 5 wt %), but this may, in some instances, deleteriously affect the medium upon which the ink was printed. One way of achieving a higher erasability without using an oxidant/reductant concentration level higher than 3 wt % includes applying, during the erasing process, the erasure fluid having the lower concentration of oxidants/reductants two or more times.

Despite the adjustability of the concentration of the erasure component depending on the colorant of the inkjet ink, the erasure component concentration still falls within a preset range. In an example, if the oxidant/reductant is chosen from persulfate ions, peroxymonosulfate ions, hydrogen peroxide, chlorate ions, and hypochlorite ions, the concentration of the oxidant/reductant ranges from about 0.25 wt % to about 6 wt % of the erasure fluid. In another example, the hydrogen peroxide is present in an amount ranging from about 2 wt % to about 4 wt % of the erasure fluid; and in yet another example, is present in an amount of about 3 wt %. The persulfate ions, peroxymonosulfate ions, chlorite ions, and hypochlorite ions may be present in an amount ranging from about 1 wt % to about 3 wt % of the erasure fluid; and in yet another example, are present in an amount of about 1 wt %. Furthermore, the ascorbic acid may be present in an amount ranging from about 1 wt % to about 10 wt %; in another example, is present in an amount ranging from about 2 wt % to about 5 wt %; and in yet another example, is present in an amount of about 4 wt %.

It is believed that the oxidants/reductants identified above may, in some cases, require a catalyst to facilitate the chemical reaction between the erasure component and the colorant of the erasable inkjet ink. For example, the ferrous ion ($Fe^{+2}$) (which may come from an iron ascorbate colorant (which is a dark, violet colorant) of the inkjet ink) may be used to catalyze a reaction between hydrogen peroxide and the iron ascorbate colorant to degrade the iron ascorbate colorant and erase the image formed by the ink from the surface of the medium. In this example, the iron ascorbate acts as both a colorant for the inkjet ink and as the catalyst for its own degradation during the erasing.

It is to be understood that other catalysts may be used to facilitate the reaction between the colorant and the erasure component, and these other catalysts may not necessarily be part of the colorant itself. Examples of other catalysts that may be used include manganese ions, cobalt ions, copper ions, and/or zinc ions. In an example, the other catalyst may be incorporated into the medium upon which the inkjet ink is established to form the image. For instance, sodium peroxymonosulfate may be activated by a chloride ion ($Cl^-$) already present in certain coated papers, such as COLOR-LOK® papers (available from Hewlett-Packard Co., Houston, Tex.) to form the hypochlorite ion. It is believed that the hypochlorite ion then reacts with, and degrades many, if not all, of the colorants of the erasable inkjet ink disclosed in PCT International Application Ser. No. PCT/US11/39023 mentioned above.

The erasure component may also or otherwise be chosen from a chelating agent, and this erasure component is useful for erasing inkjet inks containing ionically-complexed colorants that tend to have a stronger tendency to form an ion than to form a color-forming ligand. An example of such a colorant is an ionically-complexed colorant containing iron, for instance, iron ascorbate. Examples of chelating agents that may be used as the erasure component include citric acid, gluconic acid, sodium phosphate, sodium bicarbonate, ethylenediamine tetraacetic acid (EDTA), and combinations thereof. In an example, the chelating agent is present in an amount ranging from about 1 wt % to about 10 wt % of the erasure fluid. In another example, the citric acid, gluconic acid, sodium phosphate, and sodium bicarbonate (individually or in combinations thereof) may be present in an amount ranging from about 1 wt % to about 10 wt % of the erasure fluid; in another example, ranging from about 2 wt % to about 5 wt %; and in still another example, is about 4 wt %. EDTA may, for example, be present in an amount ranging from about 1 wt % to about 4 wt %; and in another example, from about 1 wt % to about 2 wt % of the erasure fluid.

In an example, the erasure fluid may further contain a polymer having a viscosity greater than 10 cP, which may allow the erasure fluid to be applied via roll coating or other non-inkjet printing methods. It is believed that the use of a polymer having a large viscosity (i.e., a viscosity larger than 10 cP) in the erasure fluid allows the fluid to stay on the surface of the medium when the fluid is applied thereto during the erasing process. In another example, the erasure fluid may further contain a polymer having a viscosity less than 10 cP, which may allow the erasure fluid to be jetted from an inkjet printhead. It is further believed that the polymer also contributes to the efficiency of the erasing process compared to water in the fibers of the paper (which may render the medium as reactive for certain reactants).

Examples of polymers that may be incorporated into the erasure fluid (e.g., into the vehicle) include carboxymethylcelluloses having a weight average molecular weight ranging from 90,000 to 1,000,000 (which has a viscosity ranging from less than about 10 cP to about 2,000 cP, depending, at least in part, on the amount of polymer added), methyl celluloses (such as, e.g., methyl hydroxyethyl ether cellulose, which can achieve viscosities ranging from less than about 10 cP to greater than about 1000 cP, again depending on the amount of the polymer added), polyethylene glycols having a weight average molecular weight of 1,000 to 20,000 (which has a viscosity ranging from about 5 cP to about 100 cP, yet again depending on the amount of the polymer added), guar gum (which has a viscosity ranging from about 100 cP to about 1000 cP, still again depending on the amount of the polymer added), starches (such as, e.g., rice starch, which has a viscosity ranging from less than about 10 cP to about 150 cP, again depending on the amount of the polymer added), and combinations thereof. Sugar components (such as, e.g., sorbitol, mannitol, and other related glycogens, which have a viscosity lower than about 5 cP) may also be added to the polymers, and are capable of interacting with the polymer(s) to increase the viscosity.

It is to be understood that the concentration of the polymer in the erasure fluid depends, at least in part, on the polymer chosen to be incorporated into the fluid. For instance, carboxymethylcelluloses and methyl hydroxyethyl ether cellulose may be present in an amount ranging from about 0.10 wt % to about 6 wt % of the erasure fluid; in another example, ranging from about 0.25 wt % to about 3 wt %; and in yet another example, ranging from about 1 wt % to about 2 wt %. The polyethylene glycols may be present in an amount ranging from about 1 wt % to about 20 wt % of the erasure fluid; in another example, ranging from about 5 wt % to about 15 wt %; and in still another example, ranging from about 10 wt % to about 15 wt %. Rice starch may be present in an amount ranging from about 1 wt % to about 10 wt % of the erasure fluid; in another example, ranging from about 2 wt % to about 6 wt %; and in yet another example, ranging from about 2 wt % to about 4 wt %. Sorbitol, for example, may be present in an amount ranging from about 1 wt % to about 20 wt % of the erasure fluid; in another example, ranging from about 2 wt % to about 10 wt %; and in yet another example, is about 5 wt %. Guar gum may be present in an amount ranging from about 1 wt % to about 3 wt %. The sugar(s) may be present in an amount ranging from about 3 wt % to about 20 wt %; and in another example, ranging from about 5 wt % to about 10 wt % of the erasure fluid.

In an example, the balance of the erasure fluid is water.

Additionally, the inventor has found that the concentration of the solvent in the erasure fluid may contribute to the integrity of the medium, e.g., with respect to curl, cockle, reliability, and durability. Further, the polymers may impart a stiffening effect to the medium, which may balance the oily effect of the solvents used in the erasure fluid after repeated erasing cycles. Improvements in curl, for example, may be accomplished by balancing the amount of curl obtained with anti-curl solvents (e.g., 1,2-propanediol, glycerol, and tetraethylene glycol) and polymers of the erasure fluid with the amount of solvent absorbed by the medium during repeated printing and erasing cycles.

In some cases, the solvent absorbed by the medium after repeated cycles of printing and erasing increases, which may cause the medium to have an oily or greasy feel. In one example, a curl-to-oil balance may be achieved with a solvent concentration ranging from about 10 wt % to about 30 wt % of the erasure fluid. In another example, the curl-to-oil balance may be achieved with a solvent concentration ranging from about 15 wt % to about 30 wt % of the erasure fluid; and in yet another example, a solvent concentration ranging from about 20 wt % to about 30 wt %. It is also believed that the application of the erasure fluid is substantially even (i.e., a substantially even amount of the fluid is coated across the surface of the medium), which may also contribute to an improvement in curl.

It is further believed that cockle may be managed by using appropriate solvents in the erasure fluid, and the durability/reliability of the medium may be managed by using the least amount of erasure fluid as possible to effectively erase the ink from the medium. In an example, the amount of the erasure fluid may be minimized by formulating the erasure fluid to perform more effectively when erasing the ink. For instance, effective performance of the erasure fluid may be achieved by increasing the viscosity of the erasing fluid (e.g., by adding higher viscosity polymer(s) to the fluid) so that the erasure fluid remains on the surface of the medium when applied thereto (noting, however, that if the erasure fluid is to be applied via inkjet printing, the viscosity of the erasure fluid should generally be less than about 10 cP).

It is to be understood that the effectiveness of the erasure fluid depends, at least in part, on certain variables of the fluid in addition to the erasure component selected, such as, e.g., the pH of the fluid. In an example, the pH of the erasure fluid should fall within a predefined range in order for the erasure component to effectively interact with a particular colorant of the inkjet ink. This is true, at least in part, because the chemical reaction that takes place between the colorant of the ink and the erasure component depends, at least in part, on the pH of the reacting medium. In some instances, it is desirable to maintain the pH of the erasure fluid above 4, whereas in other instances, a lower pH (such as 3 or lower) is also effective, for example, for applications other than for removing an inkjet ink from paper such as, e.g., in industrial applications that use non-paper substrates that can tolerate the lower pH values.

As one example, an erasure fluid containing hydrogen peroxide, persulfate ions, peroxymonosulfate ions, chlorite ions, or hypochlorite ions, should be formulated to have a pH ranging from about 2 to about 8; in another example, a pH ranging from about 4 to about 7.5; and in yet another example, a pH ranging from about 5 to about 7. An erasure fluid containing ascorbic acid should be formulated to have a pH ranging from about 3 to about 8; in another example, a pH ranging from about 4 to about 7.5; and in yet another example, a pH ranging from about 4 to about 6. Further, an erasure fluid containing citric acid should be formulated to have a pH ranging from about 3 to about 8; in another example, a pH ranging from about 4 to about 7; and in yet another example, a pH ranging from about 4 to about 5. Additionally, an erasure fluid containing gluconic acid should be formulated to have a pH ranging from about 4 to about 9; in another example, a pH ranging from about 6 to about 9; and in still another example, a pH ranging from about 7 to about 9.

Some specific example formulations of the erasure fluid are provided in Tables 1 through 5 below. It is to be understood that water makes up the balance of each of the formulations below.

TABLE 1

An example of an erasure fluid containing an oxidant/reductant erasure component

| Component | Concentration |
| --- | --- |
| sodium persulfate | 1 wt % |
| 1,2-propanediol | 15 wt % |
| Glycerol | 10 wt % |

*The pH of the erasure fluid in Table 1 was adjusted to fall within the range of about 4 to about 6

TABLE 2

Another example of an erasure fluid containing an oxidant/reductant erasure component

| Component | Concentration |
| --- | --- |
| hydrogen peroxide | 3 wt % |
| 1,2-propanediol | 15 wt % |
| Glycerol | 10 wt % |

*The pH of the erasure fluid in Table 2 was adjusted to be about 7

TABLE 3

An example of an erasure fluid containing chelating agent erasure component

| Component | Concentration |
| --- | --- |
| citric acid | 3 wt % |
| 1,2-propanediol | 10 wt % |
| Glycerol | 5 wt % |

*The pH of the erasure fluid in Table 3 was adjusted to be about 5

TABLE 4

An example of an erasure fluid containing a surfactant

| Component | Concentration |
| --- | --- |
| sodium persulfate | 1 wt % |
| 1,2-propanediol | 15 wt % |
| Glycerol | 10 wt % |
| SILWET ® 7602 | 1 wt % |

*The pH of the erasure fluid in Table 4 was adjusted to be about 5

TABLE 5

An example of an erasure fluid containing a polymer and a surfactant

| Component | Concentration |
| --- | --- |
| hydrogen peroxide | 3 wt % |
| 1,2-propanediol | 20 wt % |
| Glycerol | 20 wt % |
| Sorbitol | 10 wt % |
| SILWET ® 7602 | 1 wt % |
| PROXEL ® GXL | 0.1 wt % |

*The pH of the erasure fluid in Table 5 was adjusted to fall within the range of about 5 to about 6

An example of a method of making the erasure fluid involves forming a vehicle including at least a solvent, and adding an erasure component to the vehicle. More specifically, the erasure component is selected from the group of erasure components identified above based, at least in part, on the colorant of the erasable inkjet ink previously established or otherwise printed on the medium. In some cases, other components may be added to the vehicle, such as polymers, surfactants, and/or other additives mentioned above.

The erasure fluid may, in an example, be applied to the image formed on the medium using an inkjet printing process (e.g., thermal inkjet printing or piezoelectric inkjet printing). For instance, the erasure fluid may be packaged in an ink chamber, and then incorporated into a printing system. In some instances, the erasure fluid may be part of an ink set, e.g., where a single erasure fluid may be designed and used to erase any of the colored inks included in the ink set. It is also contemplated to incorporate more than one erasure fluid into the ink set, e.g., if a particular erasure fluid is required to erase a particular ink of the ink set. The erasure fluid may otherwise stand alone as a component of the printing system that is separate from the ink(s). In an example, the medium having the image formed thereon may be fed into the printing system, and droplets of the erasure fluid may be ejected from nozzles of the printing system and deposited onto the image.

In another example, the erasure fluid may be applied to the image formed on the medium as a post-processing coating process. For instance, the medium having the image formed thereon, may be fed into a post-processing coating apparatus, such as, e.g., a roll coater, and the erasure fluid may be applied to the medium as the medium passes through the roll coater. This roll coating apparatus may be incorporated into, or be separate from the printing system. It is to be understood that applying the erasure fluid during a post-coating process may allow the erasure fluid to contain additional additives that otherwise would not be included if the fluid was ejected using an inkjet printing system, at least in part because the additional additives may not be ink-jettable.

For instance, the erasure fluid may contain additional additives that improve curl, cockle, reliability, and durability of the medium such as, e.g., high molecular weight polymers (e.g., polymers having a weight average molecular weight that is greater than about 25,000) at concentrations greater than about 0.5 wt %, which may increase the viscosity of the erasure fluid to a value that is greater than about 10 cP (which viscosity is such that the fluid cannot effectively be printed from an inkjet pen). The erasure fluid may also or otherwise include a larger solids content (e.g., greater than about 10 wt %) in cases where the erasure fluid is applied to the medium by means other than by an inkjet pen.

To further illustrate the present disclosure, examples are given herein. It is to be understood that these examples are provided for illustrative purposes and are not to be construed as limiting the scope of the disclosure. It is to be understood that the recitation of weight percents (wt %) herein is with respect to the total weight of the respective formulation (i.e., the erasable inkjet ink or the erasure fluid).

EXAMPLES

Example 1

Figure 1:
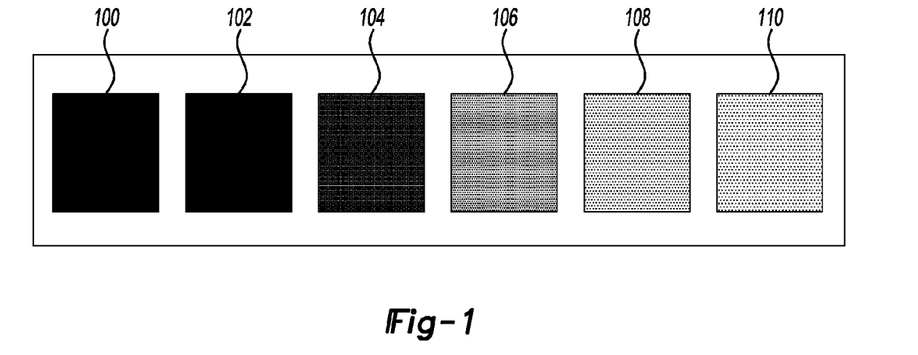
FIGS. 1 and 2 are representations showing an example of an image printed on a medium (FIG. 1) and the image erased from the medium (FIG. 2)

FIG. 1 depicts a series of blocks representing images (identified by reference numerals 100, 102, 104, 106, 108, and 110) printed five times (without erasing) on a sheet of HP Office recycled paper using an HP Photosmart 8450 inkjet printer (available from Hewlett-Packard Co., Houston, Tex.). The print density of the images shown in the blocks generally decreases as the blocks are viewed from left (i.e. image 100) to right (i.e., image 110). More specifically, the two left-most blocks in FIG. 1 (images 100, 102) were printed having a 100% print density, and the print density decreased to a print density of 50% at the far right (block 110). The ink used to produce the images was an erasable inkjet ink including about 4 wt % of saffron (from ColorMaker® Natural Yellow), about 10 wt % 1,2-propanediol, about 5 wt % glycerol, and about 0.2 wt % citric acid (buffer). The pH of the ink was adjusted to about 6.

The images formed on the paper in FIG. 1 were erased by printing, erasing, and reprinting an erasure fluid on the images five times so that a total of five erasing steps were completed. Each printing/erasing step was done after a twenty-four hour period of time had elapsed, using the same inkjet printer that was used to form the images. The erasing fluid contained a solution of about 3 wt % peroxymonosulfate, about 20 wt % 1,2-propanediol, about 20 wt % glycerol, and about 10 wt % sorbitol. The pH of the erasure fluid was adjusted to be about 6. The portion of the images 100, 102, 104, 106, 108, 110 upon which the erasure fluid was applied was substantially completely erased from the paper, as illustrated by images 100', 102', 104', 106', 108', 110' in FIG. 2.

Figure 2:
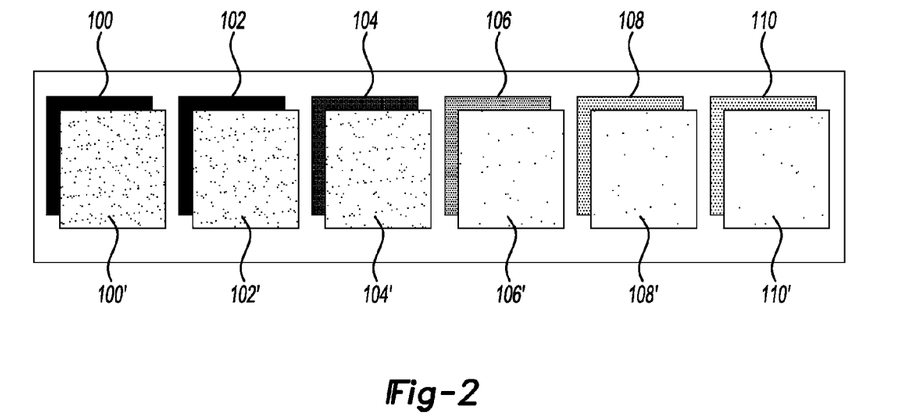

The amount (%) of ink removed from the medium was determined by measurement with a densitomer. In this Example, given the color of the ink was yellow, the B* coordinate from the LAB space (B* would most directly correspond to yellow) was measured. Based on this data, the amount of erased yellow ink was measured as about 90-92% in each of the blocks 100'-110'. Thus, about 8-10% of ink remained in each of the blocks 100'-110' after five prints and five erasures.

Example 2

Figure 3:
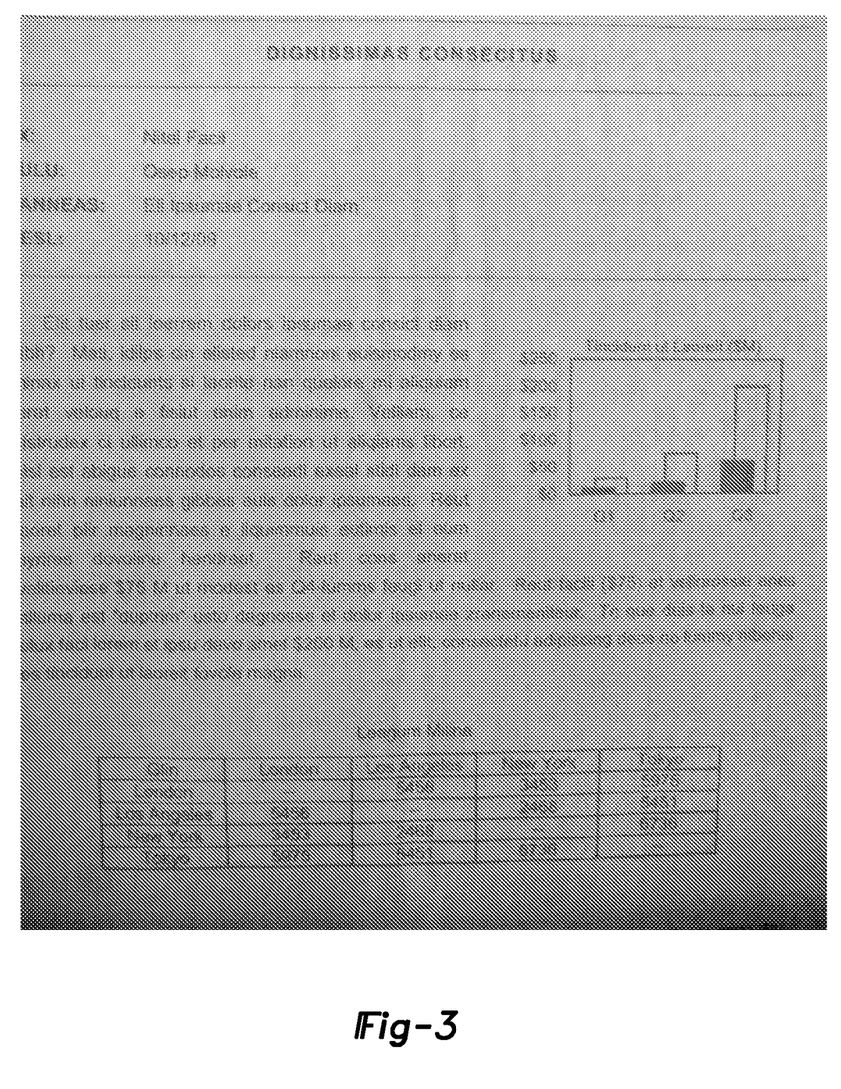
FIGS. 3 and 4 are photographs showing an example of an image reprinted on a medium after two previous erasing cycles (FIG. 3) and the image reprinted on the medium without erasing (FIG. 4)

FIG. 3 depicts an image formed by printing, erasing, and reprinting an image (in this example, the image is a text file) on a sheet of Steinbeis 100% Recycled fiber-content paper (available from Steinbeis Gluckstadt Papier GmbH & Co., Germany) using an HP DeskJet 3050 inkjet printer. The ink used to produce the images was an erasable inkjet ink including about 4 wt % iron ascorbate, about 20 wt % 1,2-propanediol, about 10 wt % glycerol, about 1 wt % sodium bisulfite, about 1 wt % sodium ascorbate, and about 2 wt % MOPS (buffer). The pH of the ink was adjusted to about 6.75.

The image was printed on the paper (as shown in FIG. 3) and rested for about twenty-four hours. Then, an erasure fluid was roll coated using a manual 8 inch wide brayer, where about 10 gsm of the erasure fluid was applied to the paper. The erasure fluid applied to the medium included about 10 wt % glycerol, about 5 wt % tetraethylene glycol, about 15 wt % PEG (molecular weight of 20,000), about 4 wt % hydrogen peroxide, and water. The pH of the erasure fluid was adjusted to be about 5. The erasure fluid also contained about 2 wt % of SHOUT® laundry detergent available from SC Johnson & Son, Inc. (Racine, Wis.) to adjust the wetting characteristics of the erasure fluid.

The paper having the image erased therefrom rested for another twenty-four hours, and then another image was reprinted onto the paper. This cycle was repeated on each side of the paper for a total of six printings (three for each side) and four erasures (two for each side). The result shown in FIG. 3 shows that the image was effectively erased from both sides of the paper and reprinted, and that the paper is reusable after two erasures performed on each side of the paper.

Figure 4:
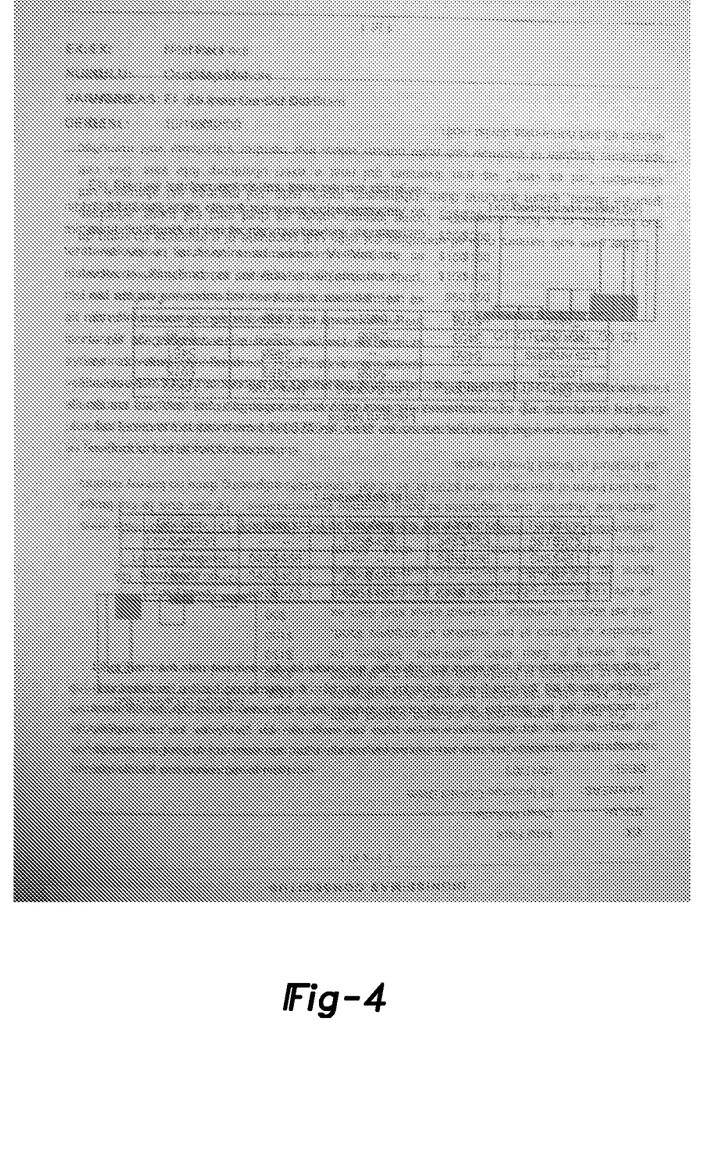

FIG. 4, on the other hand, shows the image printed on the medium without previously erasing, with an undesirable result.

Example 3

Figure 5:
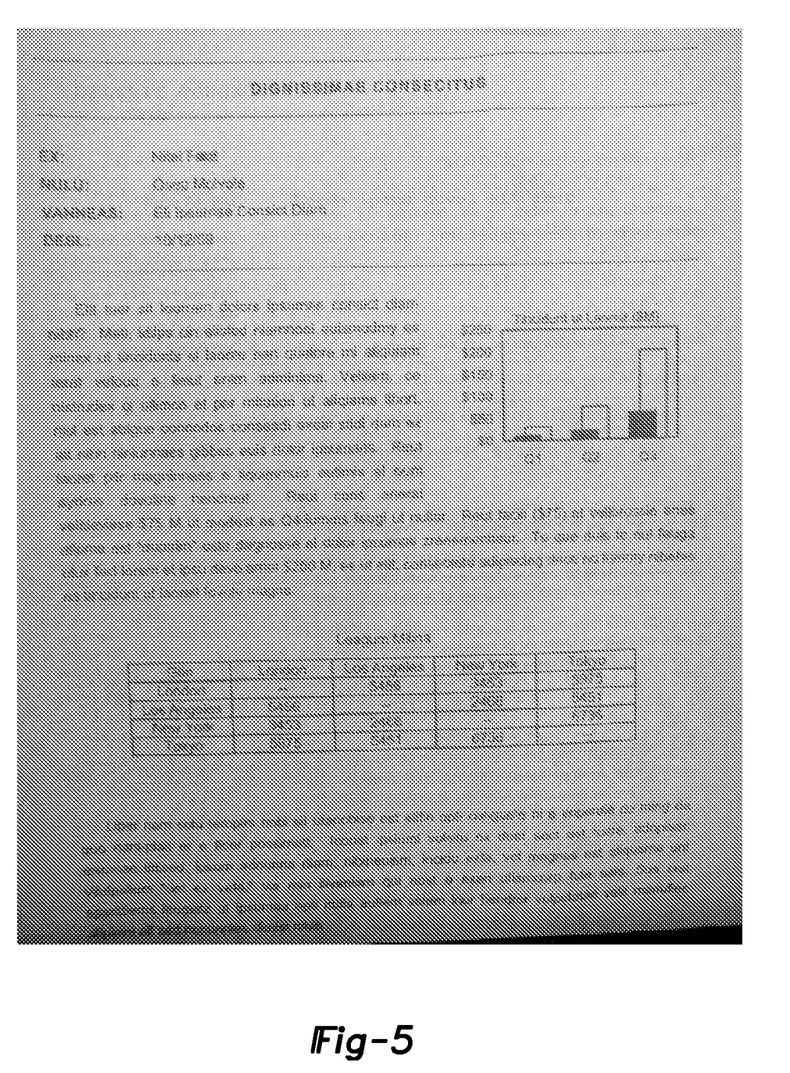
FIGS. 5 and 6 are photographs showing an example of an image reprinted on a medium after three previous erasings (FIG. 5) and the image reprinted on the medium without erasing (FIG. 6).

FIG. 5 depicts an image formed by printing, erasing, and reprinting an image (again, in this example, the image is a text file) on a sheet of HP Office paper using an HP DeskJet 3050 inkjet printer. The ink used to produce the images was the same erasable inkjet ink used to produce the images shown in FIGS. 3 and 4, and described in Example 2 above.

The image shown in FIG. 5 was printed on the paper and rested for about twenty-four hours. Then, an erasure fluid was roll coated via the same process used in Example 2. The erasure fluid included about 15 wt % glycerol, about 15 wt % tetraethylene glycol, about 4 wt % rice starch, about 4 wt % hydrogen peroxide, and water. The pH of the erasure fluid was adjusted to be about 7.

The paper having the image erased therefrom rested for another twenty-four hours, and then another image was reprinted onto the paper. This cycle was repeated on one side of the paper for a total of four printings and three erasings. The result shown in FIG. 5 shows that the image was effectively erased from the paper, and that the paper is reusable after three erasings performed on the one side of the paper.

Figure 6:
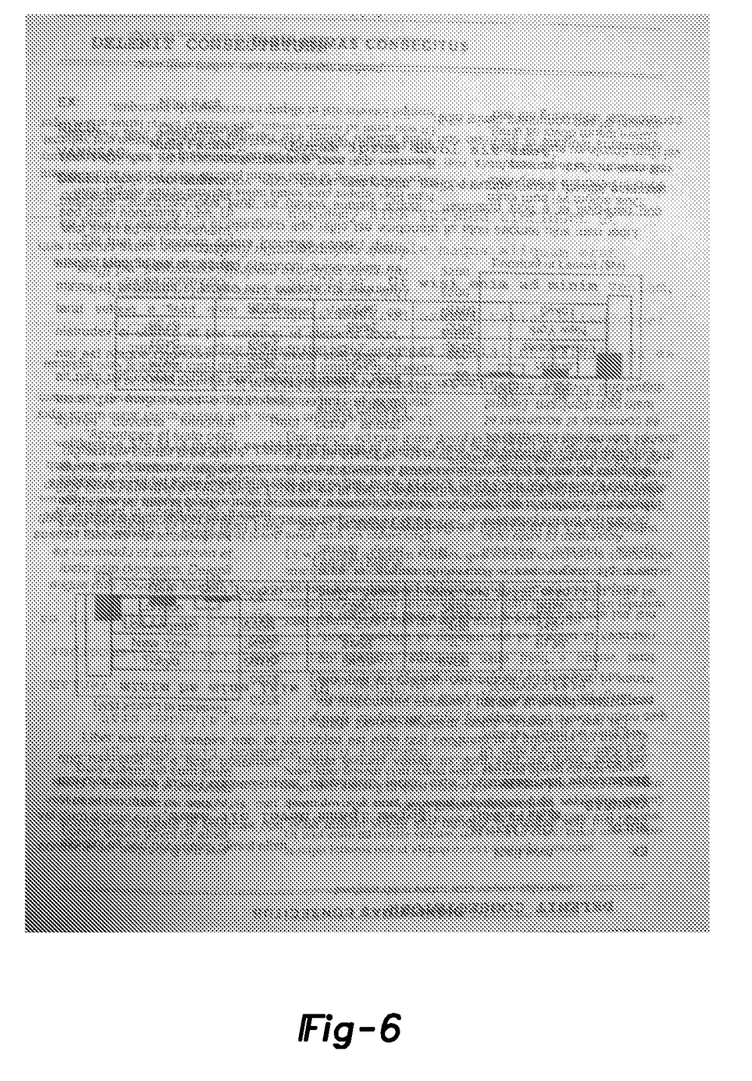

FIG. 6, on the other hand, shows the image printed on the medium without previously erasing, with an undesirable result.

It is to be understood that concentrations, amounts, and other numerical data have been presented herein in range format. It is to be understood that this range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 2 wt % to about 50 wt % should be interpreted to include not only the explicitly recited concentration limits of about 2 wt % to about 50 wt %, but also to include individual concentrations such as 10 wt %, 20 wt %, 21.5 wt %, 35 wt %, etc., and sub-ranges such as 10 wt % to 40 wt %, 15 wt % to 25 wt %, etc. As a further example, a viscosity range of less than about 10 cP should be interpreted to include 9.9 cP, 8 cP, 5 cP, 1 cP, etc., and sub-ranges such as 1 cP to 8 cP, 2 cP to 6 cP, etc. Furthermore, when "about" is utilized to describe a value, this is meant to encompass minor variations (up to +/−5%) from the stated value.

It is further to be understood that, as used herein, the singular forms of the articles "a," "an," and "the" include plural references unless the content clearly indicates otherwise.

Additionally, the term "any of", when used in conjunction with lists of components (e.g., solvents, additives, etc.) refers to one of the components included in the list alone or combinations of two or more components. For instance, the term "any of", when used with reference to a polymer, includes i) a carboxymethylcellulose alone, ii) methyl cellulose alone, iii) guar gum alone, iv) starches alone, v) or combinations of two or more of these polymers.

While several examples have been described in detail, it will be apparent to those skilled in the art that the disclosed examples may be modified. Therefore, the foregoing description is not to be considered limiting.

What is claimed is:

1. An erasure fluid, comprising:
    a vehicle;
    an erasure component incorporated into the vehicle, the erasure component being selected to interact with a selected colorant of an erasable inkjet ink printed on a paper medium to erase the inkjet ink from the paper medium, the erasure component being selected from the group consisting of persulfate ions, peroxymonosulfate ions, chlorate ions, ascorbic acid, and sodium bicarbonate;
    a polymer selected from the group consisting of carboxymethylcelluloses, methyl celluloses, polyethylene glycols, guar gum, starches, and combinations thereof; and
    a pH buffer selected from the group consisting of 3-(N-morpholino)propanesulfonic acid (MOPS), 3-morpholino-2-hydroxy-propanesulfonic acid (MOPSO), 1,4-piperazinediethanesulfonic acid (PIPES), and tris (hydroxymethyl)aminomethane (TRIS);
    wherein the erasable ink is removable from the paper medium by degradation of the colorant in response to a chemical reaction between the colorant of the erasable ink composition and the erasure component.

2. The erasure fluid as defined in claim 1 wherein the erasure component is selected from the group consisting of persulfate ions, peroxymonosulfate ions, and chlorate ions, and wherein the erasure component is present in an amount ranging from about 0.25 wt % to about 6 wt % of the erasing fluid.

3. The erasure fluid as defined in claim 1 wherein the erasure component is selected from the group consisting of ascorbic acid and sodium bicarbonate, and wherein the erasure component is present in an amount ranging from about 1 wt % to about 10 wt %.

4. The erasure fluid as defined in claim 1 wherein the vehicle comprises a solvent selected from the group consisting of 1,2-propanediol, glycerol, tetraethylene glycol, and combinations thereof, and wherein the solvent is present in an amount ranging from about 1 wt % to about 25 wt % of the erasing fluid.

5. The erasure fluid as defined in claim 1 wherein the erasure component is selected from the group consisting of sodium persulfate, sodium peroxymonosulfate, sodium chlorate, ascorbic acid, and combinations thereof, and wherein the erasure component interacts with the colorant of the inkjet ink printed on the paper medium in the presence of oxygen to erase the inkjet ink from the paper medium.

6. The erasure fluid as defined in claim 4 wherein the erasure component is activatable by a catalyst present in any of the inkjet ink or the paper medium upon which the inkjet ink was printed.

7. The erasure fluid as defined in claim 1, further comprising a surfactant selected from a non-hydrophobic material.

8. The erasure fluid as defined in claim 1 wherein the polymer selected has a viscosity less than 10 cP, and wherein the erasure fluid is jettable from an inkjet printhead.

9. An erasure fluid, comprising:
a vehicle, comprising:
1,2-propanediol present in an amount ranging from about 10 wt % to about 15 wt %; and
glycerol present in an amount ranging from about 10 wt % to about 15 wt %;
an erasure component incorporated into the vehicle, the erasure component being selected to interact with a selected colorant of an erasable inkjet ink printed on a paper medium to erase the inkjet ink from the paper medium, the erasure component being sodium persulfate present in an amount ranging from about 1 wt % to about 3 wt % of the erasure fluid; and a pH buffer selected from the group consisting of 3-(N-morpholine) propanesulfonic acid (MOPS), 3-morpholino-2-hydroxy-propanesulfonic acid (MOPSO), 1,4-piperazinediethanesulfonic acid (PIPES), and tris (hydroxymethyl)aminomethane (TRIS);
wherein the erasable ink is removable from the paper medium by degradation of the colorant in response to a chemical reaction between the colorant of the erasable ink composition and the erasure component.

10. A method of making an erasure fluid, comprising:
forming a vehicle comprising a solvent;
adding an erasure component to the vehicle, the erasure component being selected from the group consisting of persulfate ions, peroxymonosulfate ions, chlorate ions, ascorbic acid, and sodium bicarbonate;
adding a polymer to the vehicle, the polymer being selected from the group consisting of carboxymethylcelluloses, methyl celluloses, polyethylene glycols, guar gum, starches, and combinations thereof; and
adding a pH buffer to the vehicle, the pH buffer selected from the group consisting of 3-(N-morpholino)propanesulfonic acid (MOPS), 3-morpholino-2-hydroxy-propanesulfonic acid (MOPSO), 1,4-piperazinediethanesulfonic acid (PIPES), and tris(hydroxymethyl) aminomethane (TRIS);
wherein the erasure component is selected to interact with a selected colorant of an erasable inkjet ink printed on a paper medium to erase the inkjet ink from the paper medium;
and wherein the erasable ink is removable from the paper medium by degradation of the colorant in response to a chemical reaction between the colorant of the erasable ink composition and the erasure component.

11. The method as defined in claim 10, further comprising:
selecting a surfactant from a group of surfactants to contribute to removal of the colorant from fibers of the paper medium; and
incorporating the surfactant into the vehicle.

12. The method as defined in claim 10 wherein the paper medium is selected from plain papers and coated papers.

13. The method as defined in claim 10 wherein the erasure fluid is printable from an inkjet printhead.

14. The method as defined in claim 10 wherein the erasure fluid is applied to the paper medium during a post coating process to erase the inkjet ink previously printed thereon, and wherein the method further comprises incorporating an additive into the erasure fluid prior to being applied to the paper medium, the additive being selected from a material to improve any of curl, cockle, reliability, or durability of the paper medium from which the inkjet ink is to be erased.

15. The erasure fluid as defined in claim 9, further comprising a surfactant selected from a non-hydrophobic material.

16. The erasure fluid as defined in claim 9, further comprising:
a polymer selected from the group consisting of carboxymethylcelluloses, methyl celluloses, polyethylene glycols, guar gum, starches, and combinations thereof;
wherein the polymer selected has a viscosity less than 10 cP, and wherein the erasure fluid is jettable from an inkjet printhead.

17. The erasure fluid as defined in claim 1 wherein
the erasure component is the peroxymonosulfate ions, and the peroxymonosulfate ions are selected from the group consisting of sodium peroxymonosulfate, potassium peroxymonosulfate, and lithium peroxymonosulfate; or
the erasure component is the chlorate ions, and the chlorate ions are selected from the group consisting of sodium chlorate and potassium chlorate.

18. A printing system, comprising:
an ink set comprising:
an erasable inkjet ink including a colorant; and
an erasure fluid comprising:
a vehicle;
an erasure component incorporated into the vehicle, the erasure component being selected to interact with the colorant of the erasable inkjet ink printed on a paper medium to erase the inkjet ink from the paper medium, the erasure component being selected from the group consisting of persulfate ions, peroxymonosulfate ions, chlorate ions, ascorbic acid, and sodium bicarbonate; and
a polymer selected from the group consisting of carboxymethylcelluloses, methyl celluloses, polyethylene glycols, guar gum, starches, and combinations thereof; and a pH buffer selected from the group consisting of 3-(N-morpholine)propanesulfonic acid (MOPS), 3-morpholino-2-hydroxy-propanesulfonic acid (MOPSO), 1,4-piperazinediethanesulfonic acid (PIPES), and tris (hydroxymethyl)aminomethane (TRIS);
wherein the erasable inkjet ink is removable from the paper medium by degradation of the colorant in response to a chemical reaction between the colorant and the erasure component.

19. A printing system, comprising:
a paper medium;
an image formed on the paper medium from an erasable inkjet ink comprising a colorant; and
an erasure fluid to be applied on at least a portion of the image to erase the at least a portion of the image from the paper medium, the erasure fluid comprising:
a vehicle;
an erasure component incorporated into the vehicle, the erasure component being selected to chemically react with the colorant of the erasable inkjet ink and to degrade the colorant of the erasable inkjet ink in order to erase the at least the portion of the image, the erasure component being selected from the group consisting of persulfate ions, peroxymonosulfate ions, chlorate ions, ascorbic acid, and sodium bicarbonate; and a polymer selected from the group consisting of carboxymethylcelluloses, methyl celluloses, polyethylene glycols, guar gum, starches, and combinations thereof; and a pH buffer selected from the group consisting of 3-(N-morpholine)propanesulfonic acid (MOPS), 3-morpholino-2-hydroxy-propanesulfonic acid (MOPSO), 1,4-piperazinediethanesulfonic acid (PIPES), and tris(hydroxymethyl)aminomethane (TRIS); wherein the erasable inkjet ink is removable from the paper medium by degradation of the colorant in response to a chemical reaction between the colorant and the erasure component.

20. The erasure fluid as defined in claim 1 wherein:

the erasure component is selected from the group consisting of persulfate ions, peroxymonosulfate ions, and ascorbic acid; and the pH buffer causes the erasure fluid to have a pH ranging from about 4 to about 6.

* * * * *

UNITED STATES PATENT AND TRADEMARK OFFICE
CERTIFICATE OF CORRECTION

PATENT NO.       : 9,523,006 B2
APPLICATION NO.  : 14/114947
DATED            : December 20, 2016
INVENTOR(S)      : Raymond Adamic It is certified that error appears in the above-identified patent and that said Letters Patent is hereby corrected as shown below:

In the Claims

In Column 13, Line 25, in Claim 9, delete "morpholine" and insert -- morpholino --, therefor.

In Column 14, Line 20, in Claim 17, delete "wherein" and insert -- wherein: --, therefor.

In Column 14, Line 36, in Claim 18, delete "the" and insert -- the erasable --, therefor.

In Column 14, Line 40, in Claim 18, delete "bicarbonate; and" and insert -- bicarbonate; --, therefor.

In Column 14, Line 45, in Claim 18, delete "morpholine" and insert -- morpholino --, therefor.

In Column 15, Lines 2-3, in Claim 19, delete "bicarbonate; and" and insert -- bicarbonate; --, therefor.

In Column 15, Line 8, in Claim 19, delete "morpholine" and insert -- morpholino --, therefor.

Signed and Sealed this
Twenty-third Day of May, 2017

Michelle K. Lee
*Director of the United States Patent and Trademark Office*